(12) United States Patent
Takeuchi

(10) Patent No.: US 6,873,475 B2
(45) Date of Patent: Mar. 29, 2005

(54) OBJECTIVE LENS FOR OPTICAL DISCS

(75) Inventor: Shuichi Takeuchi, Saitama-ken (JP)

(73) Assignee: PENTAX Corporation, Tokyo (JP)

(*) Notice: Subject to any disclaimer, the term of this patent is extended or adjusted under 35 U.S.C. 154(b) by 0 days.

(21) Appl. No.: 10/790,737

(22) Filed: Mar. 3, 2004

(65) Prior Publication Data

US 2004/0174615 A1 Sep. 9, 2004

(30) Foreign Application Priority Data

Mar. 7, 2003 (JP) .................................. 2003-061556

(51) Int. Cl.⁷ .................... G02B 3/02; G02B 13/18; G11B 7/00
(52) U.S. Cl. ..................... 359/719; 369/44.37
(58) Field of Search .................... 359/719, 724, 359/741, 742, 641; 369/44.37, 112.03, 110.03, 109.02

(56) References Cited

U.S. PATENT DOCUMENTS

| | | |
|---|---|---|
| 6,088,322 A | 7/2000 | Broome et al. |
| 6,118,594 A | 9/2000 | Maruyama |
| 6,191,889 B1 | 2/2001 | Maruyama |
| 6,480,344 B1 | 11/2002 | Maruyama |
| 6,594,222 B2 | 7/2003 | Maruyama |
| 6,624,942 B2 | 9/2003 | Maruyama et al. |
| 6,636,365 B2 | 10/2003 | Saito et al. |
| 6,671,247 B1 | 12/2003 | Arai et al. |

FOREIGN PATENT DOCUMENTS

| | | |
|---|---|---|
| JP | 2001-216674 | 8/2001 |
| JP | 2001-249273 | 9/2001 |

*Primary Examiner*—Georgia Epps
*Assistant Examiner*—Alicia M. Harrington
(74) *Attorney, Agent, or Firm*—Greenblum & Bernstein, P.L.C.

(57) ABSTRACT

An objective lens for a plurality of types of optical discs is provided with a diffracting structure on at least one surface thereof. The surface includes an inner area including the optical axis and an outer area. The outer area includes at least one special annular zone. Part of a first beam (having a first wavelength for a first optical disc of lower data density) passed through the zone will be substantially in antiphase with part of the first beam passed through the inner area. The convergence angle θ of part of the first beam incident on the outermost part of the inner area measured after emerging from the objective lens and a design numerical aperture $NA_{ref}$ of the first optical disc satisfy:

$$1.0 < \sin \theta / NA_{ref} < 1.1.$$

The effective NA of the objective lens for the first beam is substantially equal to the design numerical aperture $NA_{ref}$.

12 Claims, 2 Drawing Sheets

OBJECTIVE LENS FOR OPTICAL DISCS

BACKGROUND OF THE INVENTION

The present invention relates to an objective lens which is used for an optical disc drive capable of recording/reading data to/from two or more types of optical discs having different data densities and cover layer thicknesses.

There exist many types of optical discs according to various standards with different data densities and different thicknesses of the cover layer (protective layer). For instance, DVD (Digital Versatile Disc) has higher record density and a thinner cover layer than CD (Compact Disc). Therefore, when an optical disc loaded on an optical disc drive is replaced with another optical disc of a different type (standard), another effective beam diameter suitable for data density of the new disc has to be attained for reading/writing information while properly correcting spherical aberration which changes depending on the cover layer thickness.

For example, for realizing the information recording/readout on optical discs having high data density, a beam spot diameter has to be reduced by increasing an NA (numerical aperture) in comparison with an optical system specially employed for optical discs having low data density. Since the beam spot diameter gets smaller as the beam wavelength gets shorter, a laser light source emitting a laser beam having a wavelength of 635–665 nm has to be employed for optical systems for DVD, which is shorter than that (780–830 nm) of optical systems exclusively used for CD. Therefore, optical disc drives (optical information recording/readout devices) of recent years are provided with an optical system having a light source unit capable of emitting laser beams of different wavelengths.

In order for properly converging and focusing the laser beam on recording surfaces of optical discs having different cover layer thicknesses, an objective lens having a diffracting structure (which is partitioned into a plurality of annular zones by small level differences) on its one side is in practical use today for the optical systems for optical discs. Such an objective lens focuses the laser beam on the recording surface of the disc constantly with a proper NA even when optical discs of different standards are used, utilizing the characteristics of the diffracting structure causing different spherical aberrations depending on the wavelength of the incident beam.

The surface of such a conventional objective lens is divided into an inner area including the optical axis of the lens and an outer area outside the inner area. Typically, the inner area has diffracting structure capable of properly focusing the beam for the CD on the recording surface of the CD while also being capable of properly focusing the beam for the DVD on the recording surface of the DVD. Meanwhile, the outer area has diffracting structure capable of properly focusing the beam for the DVD on the recording surface of the DVD while being capable of preventing the proper focusing of the beam for the CD on the recording surface of the CD and thereby avoiding excessive convergence of the beam.

That is, part of the beam for the CD that passed through the outer area is diffused on the recording surface due to large spherical aberration caused by the diffracting structure, while only part of the beam for the CD that passed through the inner area is focused on the recording surface and forms a beam spot of a relatively large diameter. In the case of the beam for DVD, the NA becomes larger since part of the beam passing through the outer area also focuses on the recording surface, by which a small beam spot suitable for information recording/readout of DVD having high data density is formed on the recording surface.

Such a DVD/CD compatible objective lens and an optical information recording/readout device employing the DVD/CD compatible objective lens have been disclosed in Japanese Patent Provisional Publications No. P2001-216674A and P2001-249273A, for example.

In the case of writable optical discs such as CD-R and CD-RW, the intensity of the beam spot (on the recording surface) for writing is desired to be higher than that for reading. Ordinary objective lenses without the compatibility with optical discs of two or more standards are capable of forming a beam spot of high intensity on the recording surface using all the beam passing through the lens. On the other hand, in the conventional DVD/CD compatible objective lens, only the inner area contributes to the conversion and focusing of the beam for the information recording/readout of CD as mentioned above. Therefore, the use of the conventional DVD/CD compatible objective lens inevitably results in low light intensity of the beam spot compared to the case of the ordinary objective lenses distributed to only one type of optical disc.

In the conventional DVD/CD compatible objective lens, it is possible to increase the beam spot intensity by enlarging effective diameter of the area through which the beam for information recording/readout of CD passes, that is, by increasing the size (area) of the inner area. However, extending the inner area is accompanied by excessive convergence of the beam spot formed on the recording surface of CD, causing insufficiency of spot diameter for information readout of the CD, unexpected large aberration due to a tilt of the disc, etc., by which the permissible range avoiding read error narrows.

SUMMARY OF THE INVENTION

The present invention is advantageous in that an improved objective lens for optical discs capable of reading/writing information from/to various types of optical discs having different recording densities is provided. Specifically, there is provided an objective lens that is suitable for reading/writing information from/to optical discs having high data density while being also usable for writing information to optical discs having low data density.

In accordance with a first aspect of the present invention, there is provided an objective lens for converging a beam emitted by a light source on a recording surface of an optical disc, having compatibility with at least two types of optical discs of different data densities by employing diffracting structure having annular zones formed on at least one surface of the objective lens. The surface on which the diffracting structure is formed includes: an inner area which focuses the beam on the recording surface of each optical disc substantially with no aberration both when a first beam of a first wavelength for information recording/readout of a first optical disc is incident thereon and when a second beam of a second wavelength for information recording/readout of a second optical disc having data density relatively higher than that of the first optical disc is incident thereon; and an outer area which focuses the second beam on the recording surface of the second optical disc substantially with no aberration while forming a wavefront that is substantially continuous with a wavefront of part of the second beam that passed through the inner area. The outer area includes at least one first annular zone which is formed so that part of the first beam that passed through the first annular zone will be substantially in antiphase with part of the first beam that passed through the inner area. A convergence angle θ [deg] of part of the first beam incident on the outermost part of the inner area measured after emerging from the objective lens and a design numerical aperture $NA_{ref}$ as an NA (Numerical Aperture) necessary for the information recording/readout of the first optical disc satisfy:

$$1.0 < \sin\theta / NA_{ref} < 1.1 \tag{1}$$

An effective NA of the objective lens for the first beam is set substantially equal to the numerical aperture $NA_{ref}$.

The first optical disc corresponds to CD, CD-R, etc., and the second optical disc corresponds to DVD, etc. In the above composition, by designing the size (area) of the inner area (necessary for attaining the compatibility with two or more types of optical discs) as large as possible, a beam spot with high intensity necessary for information writing to the first optical disc (having relatively low data density) can be formed. Further, excessive convergence of the beam spot (excessive reduction of the beam spot diameter) accompanying the enlargement of the inner area can be prevented efficiently by forming the first annular zone(s) in the outer area. Therefore, by the objective lens, a beam spot having high intensity and a proper diameter suitable for information writing to the first optical disc can be formed.

In accordance with another aspect of the present invention, there is provided an objective lens for converging a beam emitted by a light source on a recording surface of an optical disc, having compatibility with at least two types of optical discs of different data densities by employing diffracting structure having annular zones formed on at least one surface of the objective lens. The surface on which the diffracting structure is formed includes: an inner area which focuses the beam on the recording surface of each optical disc substantially with no aberration both when a first beam of a first wavelength suitable for information recording/readout of a first optical disc is incident thereon and when a second beam of a second wavelength suitable for information recording/readout of a second optical disc having data density relatively higher than that of the first optical disc is incident thereon; and an outer area which focuses the second beam on the recording surface of the second optical disc substantially with no aberration while forming a wavefront that is substantially continuous with a wavefront of part of the second beam that passed through the inner area. The objective lens is placed so that the first beam will be incident thereon as a parallel beam. The outer area includes at least one first annular zone which is formed so that part of the first beam that passed through the first annular zone will be substantially in antiphase with part of the first beam that passed through the inner area. Focal length fl of the objective lens for the first wavelength, height H of the outermost part of the inner area measured from the optical axis of the objective lens, and a design numerical aperture $NA_{ref}$ as an NA (Numerical Aperture) necessary for the information recording/readout of the first optical disc satisfy:

$$1.0 < H/(fl \cdot NA_{ref}) < 1.1 \tag{2}$$

An effective NA of the objective lens for the first beam is set substantially equal to the design numerical aperture $NA_{ref}$.

In the conditions (1) and (2), falling below the lower limit is undesirable since the light amount of the beam spot formed on the recording surface of the disc drops and thereby high-speed recording and high-precision optical pickup become impossible. Exceeding the upper limit is also undesirable since too large inner area deteriorates wavelength characteristics for the second optical disc, etc.

The aforementioned "substantially in antiphase" means that phase difference φ [deg] between the phase of the part of the first beam that passed through the first annular zone and the phase of the part of the first beam that passed through the inner area satisfies one of the following conditions (3) and (4):

$$-180° \leq \phi < -90° \tag{3}$$

$$+90° < \phi \leq +180° \tag{4}$$

In the strictest sense, the "in antiphase" means that the phase difference φ is ±180°; however, the conditions (3) and (4) can be regarded as "substantially in antiphase" since the beam spot diameter is increased by the effect of part of the first beam passing through the outer area (first annular zone) when the condition (3) or (4) is satisfied. Incidentally, when the phase differences φ is within the following range:

$$-90° < \phi < +90° \tag{8}$$

center intensity of the beam spot tends to increase and the beam spot diameter on the recording surface of the first optical disc tends to get still smaller. Such a state is called "substantially in phase".

Optionally, the "substantially in antiphase" may be defined as the satisfaction of one of the following conditions (5) and (6):

$$-180° \leq \phi \leq -120° \tag{5}$$

$$+120° \leq \phi \leq +180° \tag{6}$$

Specifically, a diameter W1 of a beam spot formed on the recording surface of the first optical disc by the first beam that passed through the objective lens and a beam spot diameter $W_{ref}$ obtained when an objective lens having an NA equal to the design numerical aperture $NA_{ref}$ is used satisfy:

$$0.99 < W1/W_{ref} < 1.01 \tag{7}$$

Satisfying the condition (7) ensures that the effective NA of the objective lens for the first beam is substantially equal to the design numerical aperture $NA_{ref}$.

Optionally, at least one of the first annular zones is formed in the vicinity of the boundary between the inner area and the outer area. By forming the first annular zones at the position, intensity of "side lobes" occurring around the center of the beam spot can be prevented from increasing.

Further optionally, the outer area includes a second annular zone which is formed in the vicinity of the periphery of the outer area so that part of the first beam that passed through the second annular zone will be substantially in phase with part of the first beam that passed through the inner area. By forming the second annular zones at the position, the side lobe intensity can be reduced without excessively reducing the beam spot diameter.

DESCRIPTION OF THE EMBODIMENT

Referring now to the drawings, a description will be given in detail of a preferred embodiment in accordance with the present invention.

Figure 1:
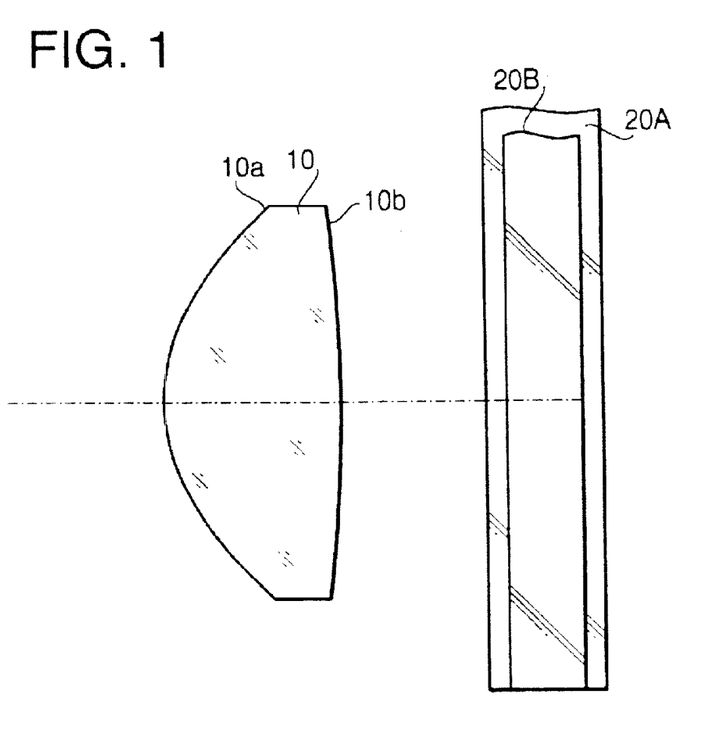
FIG. 1 schematically shows a cross-sectional view of an objective lens for optical discs in accordance with an embodiment of the present invention.

FIG. 1 schematically shows a cross-sectional view of an objective lens 10 for optical discs in accordance with an embodiment of the present invention and an optical disc (first optical disc 20A or second optical disc 20B). The objective lens 10 is installed in an optical information recording/readout device having compatibility with various types of optical discs of different data densities and cover layer thicknesses.

The optical disc 20A (20B) is set on an unshown turntable and thereby rotated at high speed for information recording/readout. Incidentally, in this specification, an optical disc having a thick cover layer and low data density (CD, CD-R, etc.) will be referred to as "first optical disc 20A", while an optical disc having a thin cover layer and high data density (DVD, etc.) will be referred to as "second optical disc 20B".

For the information recording/readout on the first optical disc 20A, a laser beam having a relatively long wavelength (hereinafter referred to as "first laser beam") is emitted by a laser light source (unshown) to form a relatively large beam spot on the recording surface of the optical disc. Meanwhile, for the information recording/readout on the second optical disc 20B of high data density, a laser beam having a wavelength shorter than that of the first laser beam (hereinafter referred to as "second laser beam") is emitted by the laser light source to form a beam spot of a small diameter on the recording surface of the optical disc.

The laser beam emitted by the light source and collimated by a collimating lens (unshown) into a parallel beam is converged by the objective lens 10 in the vicinity of the recording surface of the optical disc 20A (20B). The objective lens 10 has a first surface 10a (on its light source side) and a second surface 10b (on its optical disc side). As shown in FIG. 1, the objective lens 10 is a biconvex single lens made of plastic, with the first and second surfaces 10a and 10b both formed aspherical.

As mentioned above, the cover layer thickness differs between the first optical disc 20A and the second optical disc 20B, and thus the spherical aberration changes depending on the type of the disc used. Therefore, in this embodiment, at least one surface of the objective lens 10 (first surface 10a) is provided with specific diffracting structure having a plurality of annular zones (separated by small level differences) centering around the optical axis of the lens.

Figure 2:
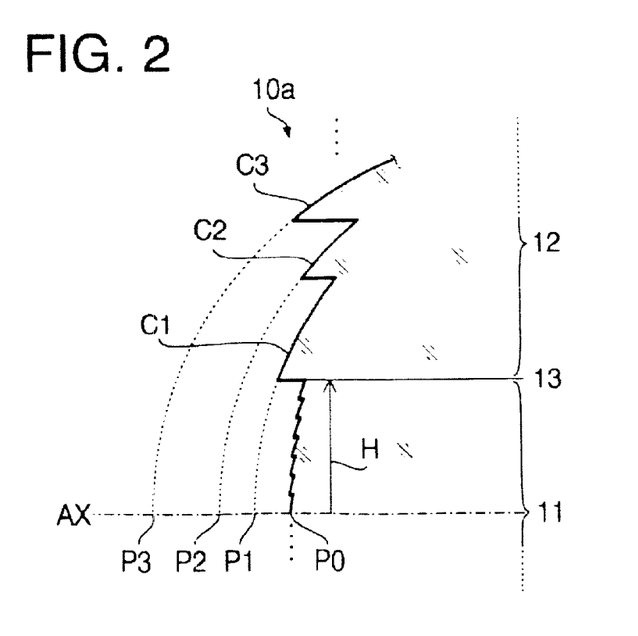
FIG. 2 is an enlarged cross-sectional view of a first surface of the objective lens of the embodiment taken along the optical axis of the lens.

FIG. 2 is an enlarged cross-sectional view of the first surface 10a of the objective lens 10 taken along the optical axis AX of the lens. The first surface 10a of the objective lens 10 has an inner area 11 around the optical axis AX and an outer area 12 around the inner area 11. Each of the inner area 11 and outer area 12 includes a plurality of annular zones separated by small level differences as mentioned above. Each level difference at each annular interface between two adjacent annular zones is a positive level differences, that is, the thickness of the objective lens 10 increases as the interface is crossed from inside to outside in a direction going away from the optical axis AX.

As schematically shown in FIG. 2, the diffracting structure in the inner area 11 of the first surface 10a is formed so that the first laser beam will be focused properly on the recording surface of the first optical disc 20A substantially with no aberration and the second laser beam will be focused properly on the recording surface of the second optical disc 20B substantially with no aberration.

The size of the inner area 11 is set to satisfy the following condition (1):

$$1.0 < \sin\theta / NA_{ref} < 1.1 \tag{1}$$

where "θ" [deg] denotes the angle between the optical axis AX and traveling direction of part of the first laser beam incident on the outermost part (periphery) 13 of the inner area 11 measured after emerging from the objective lens (hereinafter referred to as "convergence angle" for convenience), and "$NA_{ref}$" denotes NA (Numerical Aperture) necessary for the information recording/readout on the first optical disc 20A (hereinafter referred to as "design numerical aperture").

The conventional DVD/CD compatible objective lens (having the diffracting structure composed of the inner area and outer area) was designed so that the beam passing through the inner area will exactly constitute the design numerical aperture for the first optical disc 20A, whereas the inner area 11 of the objective lens 10 of this embodiment (satisfying the condition (1)) is designed to be larger than the area corresponding to the design numerical aperture. In other words, the beam passing through the inner area 11 is slightly larger than the design numerical aperture for the first optical disc 20A. By such composition of the objective lens, the intensity of the beam spot formed on the recording surface of the first optical disc 20A can be raised to a sufficient level for information writing to the first optical disc 20A.

As mentioned before, each laser beam incident on the objective lens 10 is a parallel light beam. Therefore, the above condition (1) can be rewritten as:

$$1.0 < H/(f \cdot NA_{ref}) < 1.1 \tag{2}$$

where "f1" denotes the focal length of the objective lens 10 for the first laser beam which is incident as a parallel beam, and "H" denotes the height of the periphery 13 of the inner area 11 measured from the optical axis AX.

Meanwhile, the diffracting structure formed in the outer area 12 includes a plurality of annular zones C1, C2, C3, . . . which are separated by the annular interfaces having level differences in the direction of the optical axis AX. The diffracting structure of the outer area 12 is formed so that the second laser beam will be optimally focused on the recording surface of the second optical disc 20B. Specifically, the outer area 12 is designed so that the wavefront of part of the second laser beam that passed through the outer area 12 will be substantially continuous with the wavefront of part of the second laser beam that passed through the inner area 11. By such composition of the diffracting structure, the second laser beam, passing through the inner area 11 and the outer area 12 with a large NA, forms a small beam spot on the recording surface of the second optical disc 20B.

The diffracting structure in the outer area 12 is formed so that at least one of parts of the first laser beam that passed through the annular zones C1, C2, C3, . . . , respectively, will be substantially in antiphase with part of the first laser beam that passed through the inner area 11. Hereinafter, such an annular zone will be referred to as "special annular zone (first annular zone)". The first laser beam that passed through the special annular zone has an effect of enlarging the beam spot. The first laser beam passing through annular zones other than the special annular zones has no effect or an effect of reducing the spot diameter. If part of the first laser beam that passed through an annular zone is substantially in phase with part of the first laser beam that passed through the inner area 11 (such an annular zone will hereinafter be referred to as "second annular zone"), the first laser beam that passed through the second annular zone has the effect of reducing the spot diameter.

The term "substantially in antiphase" means that phase difference $\phi$ between the two phases satisfies the following condition (3) or (4). In other words, among the annular zones C1, C2, C3, . . . formed in the outer area 12, those satisfying the condition (3) or (4) are the aforementioned special annular zones. Two phases are "substantially in phase" when the following condition (8) is satisfied.

$$-180° \leq \phi < -90° \quad (3)$$

$$+90° < \phi \leq +180° \quad (4)$$

$$-90° < \phi < +90° \quad (8)$$

Contribution of each annular zone to image formation can be expressed as $A \cdot \cos \phi$, where "A" stands for the intensity of the phase vector of the whole annular zone which is obtained from phase distribution for the imaging point ($A \geq 0$) and "$\phi$" stands for the direction of the phase vector (i.e. the phase difference). Thus, the contribution $A \cos \phi$ becomes negative when the phase difference $\phi$ satisfies the condition (3) or (4). In this case, an effect like increasing the beam spot diameter is achieved by the contribution of the part of the beam passing through the annular zone. The effect becomes more prominent when the phase difference $\phi$ also satisfies the condition (5) or (6).

$$-180° \leq \phi \leq -120° \quad (5)$$

$$+120° \leq \phi \leq +180° \quad (6)$$

The objective lens having the above diffracting structure, with the inner area 11 enlarged as much as possible, is capable of increasing the light intensity of the beam spot formed on the recording surface of the first optical disc 20A. Further, by forming at least one of the annular zones of the outer area 12 as the special annular zone, excessive convergence of the beam spot can be avoided. Therefore, by use of the objective lens 10 having the above diffracting structure, the effective NA in the information recording/readout of the first optical disc 20A becomes substantially equal to the design numerical aperture $NA_{ref}$.

The aforementioned effective NA can be evaluated from the diameter of the beam spot formed on the recording surface of the first optical disc 20A. Concretely, the sentence "The effective NA in the information recording/readout of the first optical disc 20A is substantially equal to the design numerical aperture $NA_{ref}$" is equivalent to the satisfaction of the following condition (7):

$$0.99 < W1/W_{ref} < 1.01 \quad (7)$$

where "$W_{ref}$" denotes a beam spot diameter when an imaginary objective lens having NA equal to the design numerical aperture $NA_{ref}$ is used, and "W1" denotes the diameter of a beam spot formed on the recording surface of the first optical disc 20A by the first laser beam that passed through the objective lens 10.

Incidentally, side lobes emerging around the beam spot formed on the recording surface of the first optical disc 20A contribute to the deterioration of S/N (Signal-to-Noise) ratio in the information recording/readout. Therefore, the objective lens 10 of this embodiment prevents the increase of side lobe intensity by forming at least one of the special annular zones in the vicinity of the boundary between the inner area 11 and outer area 12.

Further, in the objective lens 10 of this embodiment, an annular zone at the outermost part of the outer area 12 (i.e. nearest to the periphery of the lens) is formed as the aforementioned second annular zone. By forming the second annular zone at the position, the side lobe intensity is reduced without excessively reducing the beam spot diameter.

In the following, two concrete examples according to the embodiment of the present invention will be presented in detail. The examples are about objective lenses 10 having the compatibility with a first optical disc 20A (writable, with a cover layer 1.2 mm thick) and a second optical disc 20B (with a cover layer 0.6 mm thick).

Example 1

FIG. 1 shows the sectional form of the objective lens 10 of the first example. A second example, which will be described later, also has a similar sectional form. Specific numerical configuration of the objective lens 10 of the first example is shown in the following Table 1.

TABLE 1

| Optical Disc | 20A | 20B |
|---|---|---|
| Design Wavelength | 785 nm | 655 nm |
| Central Thickness | 1.40 mm | |
| Focal Length | 2.42 mm | 2.40 mm |
| Design NA | 0.51 | 0.65 |

In the Table 1, the "design wavelength" is the wavelength that is most suitable for the recording/readout of the optical disc (20A, 20B). The numerical configuration shown in 1 applies also to the second example. The following Table 2 shows the height range (hmin–hmax [mm]) from the optical axis AX) of the inner area 11 and that of each annular zone formed in the outer area 12.

TABLE 2

| | | hmin ≤ h < hmax |
|---|---|---|
| Inner Area 11 | | 0.000 ≤ h < 1.314 |
| Outer Area 12 | Zone C1 | 1.314 ≤ h < 1.365 |
| | Zone C2 | 1.365 ≤ h < 1.430 |
| | Zone C3 | 1.430 ≤ h < 1.443 |
| | Zone C4 | 1.443 ≤ h < 1.453 |
| | Zone C5 | 1.453 ≤ h < 1.467 |
| | Zone C6 | 1.467 ≤ h < 1.520 |
| | Zone C7 | 1.520 ≤ h < 1.560 |

As shown in Table 2, the outer area 12 of the objective lens 10 of the first example includes seven annular zones C1–C7. In Table 2, the value shown at "hmax" of the inner area 11 is the aforementioned height H of the periphery 13 of the inner area 11 measured from the optical axis AX.

The first surface 10a and second surface 10b of the objective lens 10 are aspherical surfaces. The shape of each aspherical surface is expressed by the following expression:

$$X(h) = \frac{Ch^2}{1+\sqrt{1-(K+1)C^2h^2}} + A_4h^4 + A_6h^6 + A_8h^8 + A_{10}h^{10} + A_{12}h^{12}$$

where X(h) denotes a SAG amount X(h) (i.e., a distance measured from a tangential plane contacting the aspherical surface on the optical axis) of a point on the aspherical surface whose height from the optical axis is h, "C" denotes curvature of the aspherical surface on the optical axis (1/r), "K" denotes a cone constant, "$A_4$", "$A_6$", "$A_8$", "$A_{10}$" and "$A_{12}$" denote aspherical coefficients of fourth, sixth, eighth, tenth and twelfth orders.

The cone constants and aspherical coefficients specifying the aspherical shape of the first surface 10a will be shown in the following Table 3, while those specifying the aspherical shape of the second surface 10b will be shown in the following Table 4.

The diffracting structure formed on the inner area 11 of the first surface 10a (surface number: 1) of the objective lens 10 can be expressed by the following optical path difference function ϕ (h).

$$\phi(h) = (P_2h^2 + P_4h^4 + P_6h^6 + \ldots) \times m \times \lambda$$

The optical path difference function ϕ(h) indicates the difference of optical path length between an imaginary beam which is assumed not to be diffracted by the diffracting structure (at the point on the diffracting surface (first surface 10a) with the height h from the optical axis) and a beam diffracted by the diffracting structure, in which "$P_2$", "$P_4$", "$P_6$" . . . are coefficients of second, fourth, sixth orders, etc. The optical path difference function coefficients $P_2$, $P_4$, $P_6$ . . . specifying the diffracting structure are shown in the following Table 5. The factor "m" denotes the order of the diffracted beam that is used (m=1 in this embodiment).

TABLE 3

| First Surface | r | K | d_shift |
|---|---|---|---|
| Inner Area 11 | 1.49000 | −0.5000 | 0.00000 |
| C1 | 1.50330 | −0.5000 | −0.01938 |
| C2 | 1.50458 | −0.5000 | −0.02302 |
| C3 | 1.50543 | −0.5000 | −0.02544 |
| C4 | 1.50585 | −0.5000 | −0.02665 |
| C5 | 1.50628 | −0.5000 | −0.02787 |
| C6 | 1.50713 | −0.5000 | −0.03029 |
| C7 | 1.50840 | −0.5000 | −0.03392 |

|  | A4 | A6 | A8 | A10 | A12 |
|---|---|---|---|---|---|
| Inner Area 11 | −1.01720E−02 | −1.89400E−03 | −3.93700E−04 | 2.49600E−04 | −1.73400E−04 |
| C1 | −2.82919E−03 | 1.42548E−03 | −1.67316E−03 | 1.05763E−03 | −3.17532E−04 |
| C2 | −2.81694E−03 | 1.41851E−03 | −1.66315E−03 | 1.05029E−03 | −3.14839E−04 |
| C3 | −2.80877E−03 | 1.41385E−03 | −1.65647E−03 | 1.04539E−03 | −3.13045E−04 |
| C4 | −2.80060E−03 | 1.40920E−03 | −1.64980E−03 | 1.04050E−03 | −3.11250E−04 |
| C5 | −2.79652E−03 | 1.40687E−03 | −1.64646E−03 | 1.03805E−03 | −3.10353E−04 |
| C6 | −2.79243E−03 | 1.40455E−03 | −1.64313E−03 | 1.03561E−03 | −3.09455E−04 |
| C7 | −2.78426E−03 | 1.39989E−03 | −1.63645E−03 | 1.03071E−03 | −3.07661E−04 |

TABLE 4

| Second Surface | |
|---|---|
| r | −6.55000 |
| K | 0.0000 |
| A4 | −2.01600E−02 |
| A6 | −4.02700E−03 |
| A8 | −6.69000E−03 |
| A10 | −2.13800E−03 |
| A12 | −2.50000E−04 |

As shown in Table 3, the objective lens 10 of the first example has seven aspherical surfaces: annular zones C1–C7 separated by the annular interfaces having level differences. Each "d_shift" in Table 3 denotes the shift amount of each "surface top". The "surface top" means the top (leftmost point in FIG. 2) of each aspherical surface in its complete shape (dotted line shown in FIG. 2 extending from each annular zone C1, C2, C3, . . . ), that is, the intersection point (P1, P2, P3, . . . ) of each complete aspherical surface (dotted line) with the optical axis AX. Thus, the "shift amount of each surface top" means the distance between P0 (intersection point of the actual first surface 10a with the optical axis AX) and each surface top P1, P2, P3, . . . . The notation "E-On" (n: integer) in Table 3 indicates "×10$^{-n}$". The same applies to the following tables.

TABLE 5

| P2 | 1.2000 |
|---|---|
| P4 | −6.2380 |
| P6 | −1.2000 |
| P8 | 0.0000 |
| P10 | 0.0000 |
| P12 | 0.0000 |

The direction and intensity of the phase vector in each annular zone C1–C7 will be shown in the following Table 6.

TABLE 6

| | Phase Vector | |
|---|---|---|
| | Direction | Intensity |
| C1 | 160 | 0.63 |
| C2 | 170 | 0.53 |
| C3 | −147 | 0.73 |
| C4 | −171 | 0.61 |
| C5 | 158 | 0.81 |
| C6 | −178 | 0.69 |
| C7 | −51 | 0.19 |

As shown in Table 6, in the objective lens 10 of the first example, annular zones C1–C6 (of the outer area 12) are the special annular zones further satisfying the condition (5) or (6). As a matter of course, the annular zones C1–C6 satisfy the condition (3) or (4). Therefore, the objective lens 10 of the first example is capable of preventing the excessive convergence of the beam spot accompanying the enlargement of the inner area 11. Incidentally, the annular zone C7 in the outermost part of the outer area 12 is the aforementioned second annular zone. By the second annular zone C7, the side lobe intensity can be reduced without excessively reducing the beam spot diameter.

Figure 3:
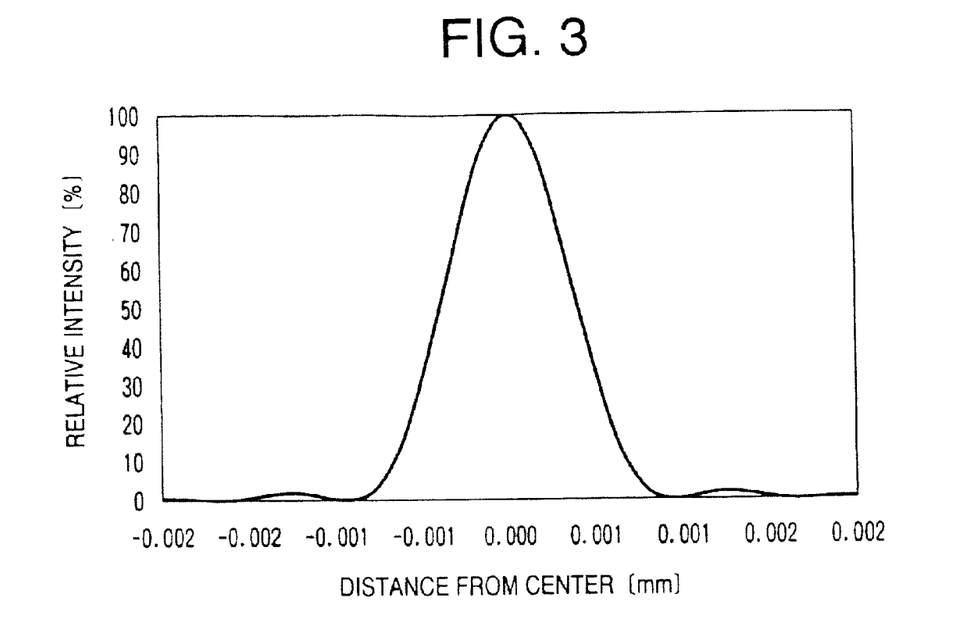
FIG. 3 is a graph showing light intensity (relationship between light intensity and distance from spot center) of a beam spot formed on the recording surface of a first optical disc by focusing a first laser beam using an objective lens of a first example of the embodiment.

Among the special annular zones, the annular zone C1 is formed in the vicinity of the boundary between the inner area 11 and outer area 12, by which the effect of preventing the increase of side lobe intensity can be achieved. FIG. 3 is a graph showing light intensity of the beam spot formed by focusing the first laser beam on the recording surface of the first optical disc 20A by use of the objective lens 10 of the first example, in which the horizontal axis indicates distance [mm] from the center of the beam spot and the vertical axis indicates relative light intensity [%] compared to that (100) at the spot center. The objective lenses 10 of the first example and second example (described later) are compared with conventional objective lenses in the following table 7. As seen in FIG. 3 and Table 7, the light intensity of the whole beam spot increased successfully in the first and second examples by designing the inner area 11 to be larger than that of the conventional objective lens. Meanwhile, the spot diameter did not decrease in spite of the enlarged inner area 11. Further, the relative intensity of side lobes nearest to the spot center (approximately ±0.001 mm–+0.002 mm from the spot center) is kept down below approximately 5%. Therefore, by use of the objective lens 10 of the first example, a beam spot having relatively high intensity and a proper diameter suitable for the writable first optical disc 20A can be ensured while reducing the intensity of side lobes causing the S/N deterioration in the information recording/readout.

TABLE 7

|  | Ex. #1 | Ex. #2 | Conv. #1 |  |
|---|---|---|---|---|
| $\sin\theta/NA_{ref}$ | 1.081 | 1.091 |  | cond. (1) |
| $H/(fl \cdot NA_{ref})$ | 1.065 | 1.074 |  | cond. (2) |
| Spot diameter $(1/e^2)$ | 0.994 | 0.994 | 1.000 | cond. (7) |

TABLE 7-continued

|  | Ex. #1 | Ex. #2 | Conv. #1 |
|---|---|---|---|
| Central Intensity | 1.060 | 1.063 | 1.000 |
| Spot Intensity | 1.056 | 1.058 | 1.000 |

Example 2

The specific numerical configuration, the functions specifying the aspherical shape of the second surface 10b, and the optical path difference function coefficients of the objective lens 10 of the second example are similar to those of the first example, and thus repeated description thereof is omitted for brevity. The following Table 8 shows the height range (hmin–hmax [mm]) from the optical axis AX) of the inner area 11 and that of each annular zone in the outer area 12 of the objective lens of the second example.

TABLE 8

|  |  | hmin ≦ h < hmax |
|---|---|---|
| Inner Area 11 |  | 0.000 ≦ h < 1.326 |
| Outer Area 12 | Zone C1 | 1.326 ≦ h < 1.350 |
|  | Zone C2 | 1.350 ≦ h < 1.417 |
|  | Zone C3 | 1.417 ≦ h < 1.435 |
|  | Zone C4 | 1.435 ≦ h < 1.446 |
|  | Zone C5 | 1.446 ≦ h < 1.456 |
|  | Zone C6 | 1.456 ≦ h < 1.470 |
|  | Zone C7 | 1.470 ≦ h < 1.520 |
|  | Zone C8 | 1.520 ≦ h < 1.560 |

As shown in Table 8, the outer area 12 of the objective lens 10 of the second example includes eight annular zones C1–C8. In Table 8, the value shown at "hmax" of the inner area 11 is the aforementioned height H of the periphery 13 of the inner area 11 measured from the optical axis AX. The cone constants and aspherical coefficients specifying the aspherical shape of the first surface 10a of the objective lens 10 of the second example will be shown in the following Table 9.

TABLE 9

| Inner Area 11 | 1.49000 | −0.5000 | 0.00000 |
|---|---|---|---|
| C1 | 1.50330 | −0.5000 | −0.01938 |
| C2 | 1.50415 | −0.5000 | −0.02181 |
| C3 | 1.50500 | −0.5000 | −0.02423 |
| C4 | 1.50543 | −0.5000 | −0.02544 |
| C5 | 1.50585 | −0.5000 | −0.02665 |
| C6 | 1.50628 | −0.5000 | −0.02787 |
| C7 | 1.50713 | −0.5000 | −0.03029 |
| C8 | 1.50840 | −0.5000 | −0.03392 |

|  | A4 | A6 | A8 | A10 | A12 |
|---|---|---|---|---|---|
| Inner Area 11 | −1.01720E−02 | −1.89400E−03 | −3.93700E−04 | 2.49600E−04 | −1.73400E−04 |
| C1 | −2.80877E−03 | 1.41382E−03 | −1.65647E−03 | 1.04539E−03 | −3.13045E−04 |
| C2 | −2.80060E−03 | 1.40920E−03 | −1.64980E−03 | 1.04050E−03 | −3.11250E−04 |
| C3 | −2.79243E−03 | 1.40455E−03 | −1.64313E−03 | 1.03561E−03 | −3.09455E−04 |
| C4 | −2.78835E−03 | 1.40222E−03 | −1.63979E−03 | 1.03316E−03 | −3.08558E−04 |
| C5 | −2.78426E−03 | 1.39989E−03 | −1.63645E−03 | 1.03071E−03 | −3.07661E−04 |
| C6 | −2.78018E−03 | 1.39757E−03 | −1.63312E−03 | 1.02826E−03 | −3.06763E−04 |
| C7 | −2.77201E−03 | 1.39292E−03 | −1.62644E−03 | 1.02337E−03 | −3.04968E−04 |
| C8 | −2.75976E−03 | 1.38594E−03 | −1.61643E−03 | 1.01603E−03 | −3.02276E−04 |

The direction and intensity of the phase vector in each annular zone C1–C8 of the objective lens 10 of the second example will be shown in the following Table 10.

TABLE 10

| | Phase Vector | |
|---|---|---|
| | Direction | Intensity |
| C1 | 172 | 0.91 |
| C2 | −162 | 0.50 |
| C3 | −133 | 0.89 |
| C4 | −176 | 0.65 |
| C5 | 166 | 0.61 |
| C6 | 135 | 0.81 |
| C7 | 170 | 0.53 |
| C8 | −51 | 0.19 |

As shown in Table 10, in the objective lens 10 of the second example, annular zones C1–C7 are the special annular zones further satisfying the condition (5) or (6). As a matter of course, the annular zones C1–C7 satisfy the condition (3) or (4). Therefore, the objective lens 10 of the first example is capable of preventing the excessive convergence of the beam spot accompanying the enlargement of the inner area 11. Incidentally, the annular zone C8 in the outermost part of the outer area 12 is the aforementioned second annular zone. By the second annular zone C8, the side lobe intensity can be reduced without excessively reducing the beam spot diameter.

Figure 4:
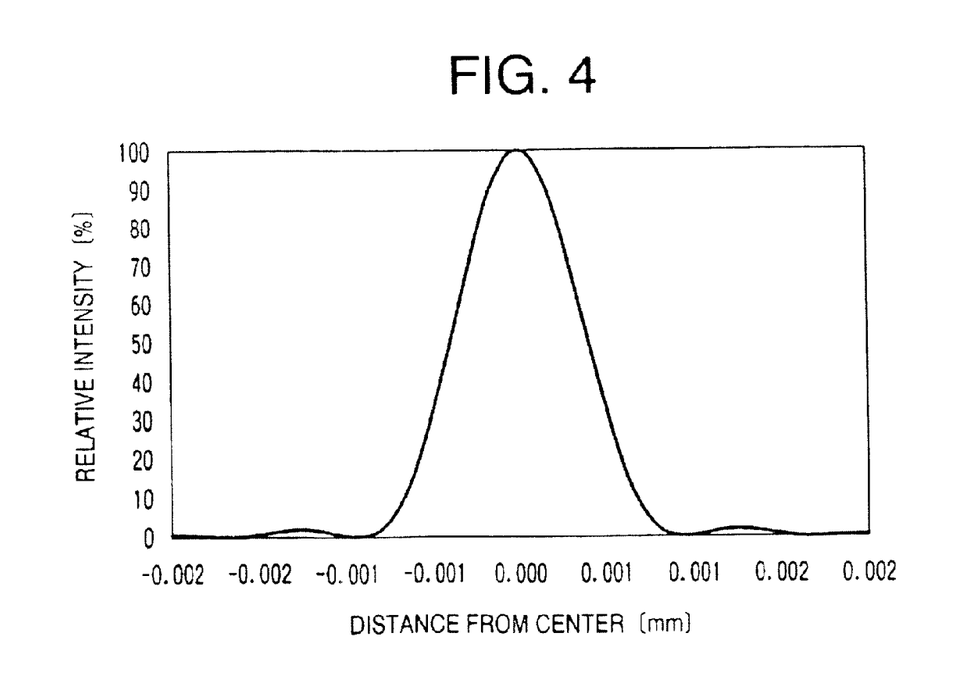
FIG. 4 is a graph showing light intensity (relationship between light intensity and distance from spot center) of a beam spot formed on the recording surface of a first optical disc by focusing a first laser beam using an objective lens of a second example of the embodiment.

Among the special annular zones, the annular zone C1 is formed in the vicinity of the boundary between the inner area 11 and outer area 12. Therefore, the effect of preventing the increase of side lobe intensity can be achieved also in the objective lens 10 of the second embodiment. FIG. 4 is a graph showing light intensity of the beam spot formed by focusing the first laser beam on the recording surface of the first optical disc 20A by use of the objective lens 10 of the second example, in which the horizontal axis indicates distance [mm] from the center of the beam spot and the vertical axis indicates relative light intensity [%] compared to that (100) at the spot center. As shown in FIG. 4, the objective lens 10 of the second example also has the effect of preventing the increase of side lobe intensity similarly to the first example.

Incidentally, as seen in the aforementioned Table 7, the objective lenses 10 of the first and second examples both satisfy the conditions (1) and (2), that is, the periphery 13 of the inner area 11 is formed outside a position corresponding to the design numerical aperture for CD. In other words, the size (area) of the inner area 11 for attaining the compatibility with the first optical disc 20A and the second optical disc 20B is set larger. By the composition, a beam spot of higher light intensity is formed on the recording surface of the first optical disc 20A. The higher beam spot intensity obtained by the objective lenses 10 of the present invention compared to the conventional objective lens (CONVENTIONAL #1) is also seen in Table 7.

The phenomenon of excessive convergence of the beam spot accompanying the improvement of the beam spot intensity is suppressed by the effects of the special annular zones described in the above examples, by which the beam spot formed by the beam passing through the objective lens 10 of each example satisfies the condition (7), that is, a beam spot of a diameter substantially equal to that in CONVENTIONAL #1 can be formed on the recording surface of the first optical disc.

While the objective lens 10 in accordance with the embodiment of the present invention has been described taking the above particular examples, the embodiment is not limited to the particular numerical configurations of the above examples. For example, it is also possible to provide the diffracting structure to the second surface 10b (not to the first surface 10a) or to both the first and second surfaces 10a and 10b.

Further, the design numerical apertures shown in Table 1 are only examples. In the objective lens 10 of the present invention, any relatively large NA necessary for the writable first optical disc 20A (0.50 or more) can be employed as the design numerical aperture for the first optical disc 20A. Similarly, any large NA necessary for the second optical disc 20B (0.62 or more) can be employed as the design numerical aperture for the second optical disc 20B.

As described above, in the objective lens in accordance with the embodiment of the present invention, a beam having both high light intensity and a proper NA capable of forming a beam spot of a proper diameter suitable for information recording/readout of writable optical discs having relatively thick cover layers can be formed while ensuring the compatibility with two or more types of optical discs having different data densities and cover layer thicknesses.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

The present disclosure relates to the subject matter contained in Japanese Patent Application No. 2003-061556, filed on Mar. 7, 2003, which is expressly incorporated herein by reference in its entirety.

What is claimed is:

1. An objective lens for converging a beam emitted by a light source on a recording surface of an optical disc, having compatibility with at least two types of optical discs of different data densities by employing a diffracting structure having annular zones formed on at least one surface of the objective lens, the surface on which the diffracting structure is formed including:

an inner area which focuses the beam on the recording surface of each optical disc substantially with no aberration both when a first beam of a first wavelength for information recording/readout of a first optical disc is incident thereon and when a second beam of a second wavelength for information recording/readout of a second optical disc having data density relatively higher than that of the first optical disc is incident thereon; and an outer area which focuses the second beam on the recording surface of the second optical disc substantially with no aberration while forming a wavefront that is substantially continuous with a wavefront of part of the second beam that passed through the inner area, wherein the outer area includes at least one first annular zone which is formed so that part of the first beam that passed through the first annular zone will be substantially in antiphase with part of the first beam that passed through the inner area, wherein a convergence angle θ [deg] of part of the first beam incident on the outermost part of the inner area measured after emerging from the objective lens and a design numerical aperture $NA_{ref}$ as an NA (Numerical Aperture) necessary for the information recording/readout of the first optical disc satisfy:

$1.0 < \sin θ/NA_{ref} < 1.1$, and wherein an effective NA of the objective lens for the first beam is substantially equal to the numerical aperture $NA_{ref}$.

2. The objective lens according to claim 1, wherein phase difference φ [deg] between the phase of the part of the first beam that passed through the first annular zone and the phase of the part of the first beam that passed through the inner area satisfies one of the following conditions:

$-180° \leq φ < -90°$, and $+90° < φ \leq +180°$.

3. The objective lens according to claim 2, wherein the phase difference φ further satisfies one of the following conditions:

$-180° \leq φ \leq -120°$, $+120° \leq φ \leq +180°$.

4. The objective lens according to claim 1, wherein a diameter W1 of a beam spot formed on the recording surface of the first optical disc by the first beam that passed through the objective lens and a beam spot diameter $W_{ref}$ obtained when an objective lens having an NA equal to the design numerical aperture $NA_{ref}$ is used satisfy:

$0.99 < W1/W_{ref} < 1.01$.

5. The objective lens according to claim 1, wherein at least one of the first annular zones is formed in the vicinity of the boundary between the inner area and the outer area.

6. The objective lens according to claim 1, wherein the outer area includes a second annular zone which is formed in the vicinity of the periphery of the outer area so that part of the first beam that passed through the second annular zone will be substantially in phase with part of the first beam that passed through the inner area.

7. An objective lens for converging a beam emitted by a light source on a recording surface of an optical disc, having compatibility with at least two types of optical discs of different data densities by employing diffracting structure having annular zones formed on at least one surface of the objective lens, the surface on which the diffracting structure is formed including:

an inner area which focuses the beam on the recording surface of each optical disc substantially with no aberration both when a first beam of a first wavelength suitable for information recording/readout of a first optical disc is incident thereon and when a second beam of a second wavelength suitable for information recording/readout of a second optical disc having data density relatively higher than that of the first optical disc is incident thereon; and an outer area which focuses the second beam on the recording surface of the second optical disc substantially with no aberration while forming a wavefront that is substantially continuous with a wavefront of part of the second beam that passed through the inner area, wherein the objective lens is placed so that the first beam will be incident thereon as a parallel beam, wherein the outer area includes at least one first annular zone which is formed so that part of the first beam that passed through the first annular zone will be substantially in antiphase with part of the first beam that passed through the inner area, wherein focal length fl of the objective lens for the first wavelength, height H of the outermost part of the inner area measured from the optical axis of the objective lens, and a design numerical aperture $NA_{ref}$ as an NA (Numerical Aperture) necessary for the information recording/readout of the first optical disc satisfy:

$1.0 < H/(fl \cdot NA_{ref}) < 1.1$, and wherein an effective NA of the objective lens for the first beam is substantially equal to the design numerical aperture $NA_{ref}$.

8. The objective lens according to claim 7, wherein phase difference φ [deg] between the phase of the part of the first beam that passed through the first annular zone and the phase of the part of the first beam that passed through the inner area satisfies one of the following conditions:

$-180° \leq φ < -90°$, and $+90° < φ \leq +180°$.

9. The objective lens according to claim 8, wherein the phase difference φ further satisfies one of the following conditions:

$-180° \leq φ \leq -120°$, and $+120° \leq φ \leq +180°$.

10. The objective lens according to claim 7, wherein a diameter W1 of a beam spot formed on the recording surface of the first optical disc by the first beam that passed through the objective lens and a beam spot diameter $W_{ref}$ obtained when an objective lens having an NA equal to the design numerical aperture $NA_{ref}$ is used satisfy:

$0.99 < W1/W_{ref} < 1.01$.

11. The objective lens according to claim 7, wherein at least one of the first annular zones is formed in the vicinity of the boundary between the inner area and the outer area.

12. The objective lens according to claim 7, wherein the outer area includes a second annular zone which is formed in the vicinity of the periphery of the outer area so that part of the first beam that passed through the second annular zone will be substantially in phase with part of the first beam that passed through the inner area.

* * * * *